Feb. 26, 1957  G. W. CRABTREE  2,782,877

SPRING CONTROLLING UNIT

Filed May 1, 1953  2 Sheets-Sheet 1

INVENTOR.
GEORGE W. CRABTREE
BY
ATT.

Feb. 26, 1957 G. W. CRABTREE 2,782,877
SPRING CONTROLLING UNIT
Filed May 1, 1953 2 Sheets-Sheet 2
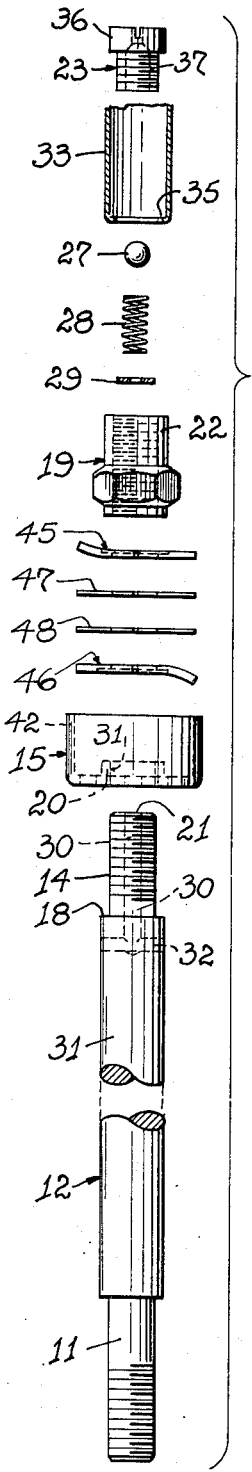
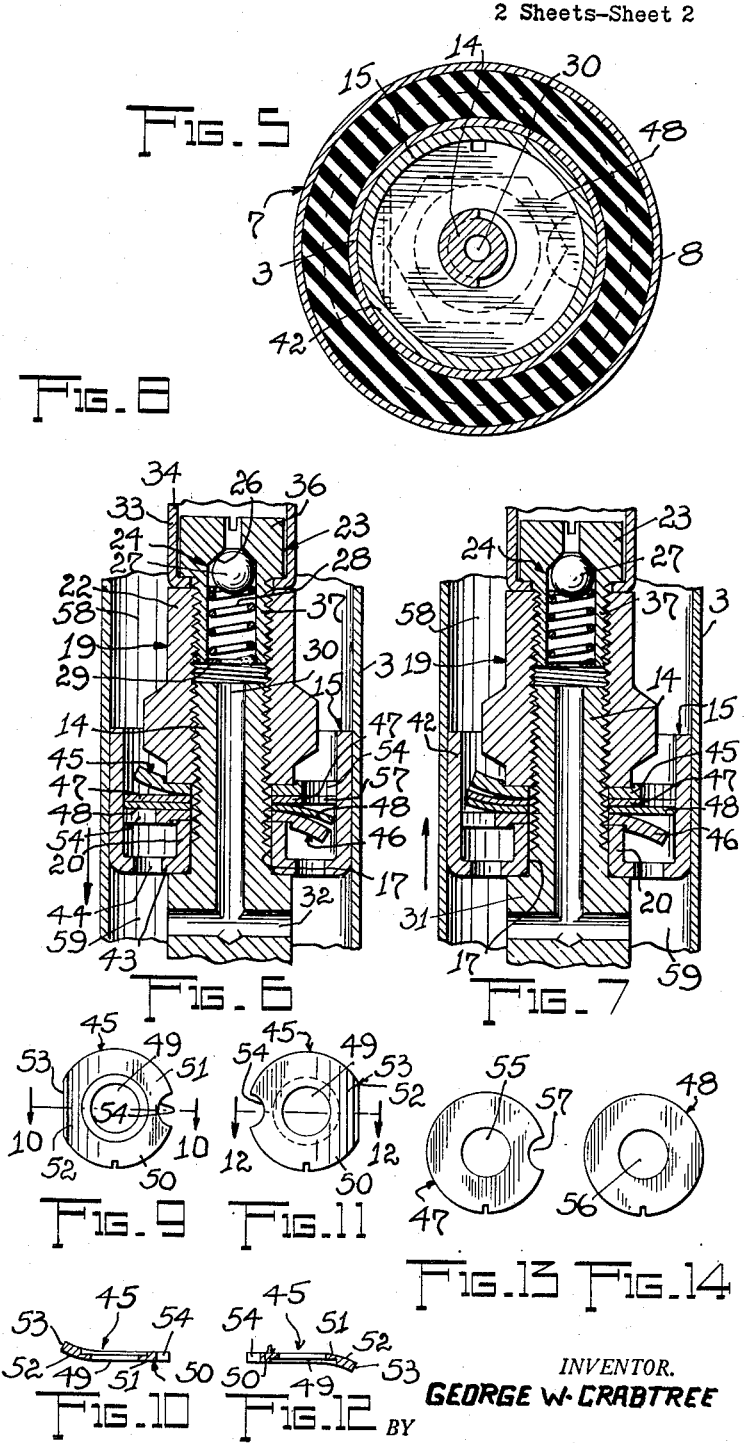
INVENTOR.
GEORGE W. CRABTREE
BY
ATT United States Patent Office 2,782,877
Patented Feb. 26, 1957

2,782,877

SPRING CONTROLLING UNIT

George W. Crabtree, Cleveland Heights, Ohio

Application May 1, 1953, Serial No. 352,520

2 Claims. (Cl. 188—88)

The present invention relates to double-acting, hydraulic, spring-controlling units of the directly actuated type constructed to include a liquid-filled cylinder having slidably arranged therein a valved piston member adapted to check and retard movements of vehicle springs under compression and their reflex actions under rebound by forcible displacement of liquid through its valved portion from one end of the liquid-filled cylinder to its other end and vice versa.

Hydraulic spring-controlling units of this type generally differ at opposite sides of their piston members in the usable size of the cross section of their working or cylinder chamber, which makes it difficult to keep the cylinder chamber properly filled with liquid to avoid forming of air and vapor bubbles causing a substantial decrease in the efficiency of the spring-controlling unit.

It is the general object of this invention to provide a double-acting, hydraulic, spring-controlling unit of the type referred to above, which includes specific piston means constructed to equalize the usable size of the cross section of the working or cylinder chamber at opposite sides of the piston member therein to retain in the operation of the unit all liquid in the cylinder chamber and eliminate presently practiced forcible valve-controlled transfer of liquid from the cylinder chamber to a liquid reservoir and vice versa.

This general object of the invention is attained by providing the hydraulic spring-controlling unit with a piston means which has extended from its opposite sides axially aligned piston rod means, the one means forming an operating piston rod adapted to effect reciprocation of the valved piston in the cylinder chamber and the other one means forming a tubular liquid storage element adapted to guide the valved piston and effect automatic replacement of liquid lost by leakage or evaporation from the cylinder chamber.

Another object of the invention, therefore, is the provision of a double-acting, hydraulic spring-controlling unit of the type referred to above which is constructed to include a valved piston, a piston rod extended from one end of the valved piston and adapted to effect its reciprocation in the cylinder chamber and a tubular rod extended from the other end of the valved piston and arranged in valved communication with the cylinder chamber portion adjacent to the said one end of the valved piston, which tubular rod is adapted to form a liquid storage chamber for the cylinder chamber adapted to effect automatic replacement of liquid lost from the cylinder chamber either by leakage or evaporation.

With the above and other incidental objects in view, the invention has other marked improvements and superiorities which radically distinguish same from presently known structures. These improvements or superior characteristics embodying certain novel features of construction are clearly set forth in the appended claims, and a preferred form of embodiment of the invention is hereinafter shown with reference to the accompanying drawings forming part of the specification.

In the drawings:

Fig. 5 is a cross sectional view taken on line 5—5 of Fig. 3.

Fig. 6 is an enlarged fragmentary sectional view similar to Fig. 3 showing the piston valve in its position during a compression stroke of the spring controlling unit; and Fig. 7 is a view similar to Fig. 6 showing the piston valve in its position during a rebound stroke of the spring-controlling unit.

Fig. 8 is an exploded view of all the parts of the piston assembly shown in Fig. 1.

Fig. 9 is a plan view of a valve backing plate of the valve assembly; and

Fig. 10 is a cross sectional view taken on line 10—10 of Fig. 9.

Fig. 11 is a bottom view of a valve backing plate of the valve assembly; and

Fig. 12 is a cross sectional view taken on line 12—12 of Fig. 11.

Fig. 13 is a plan view of the secondary valve disk; and

Fig. 14 is a plan view of the primary valve disk.

Figure 1:
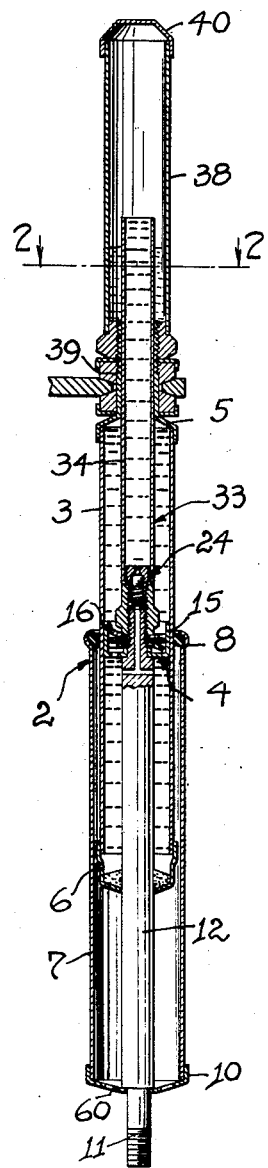
Fig. 1 is a longitudinal sectional view partly in elevation of a double-acting, hydraulic, spring-controlling unit constructed in accordance with the invention.
Figure 2:
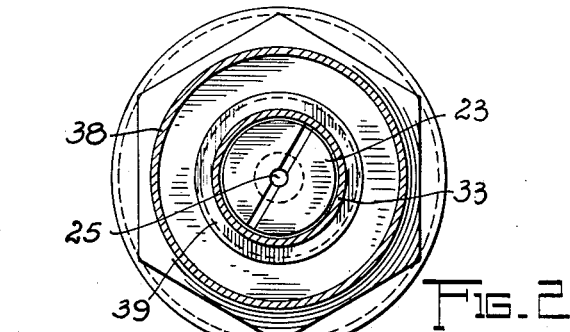
Fig. 2 is a cross sectional view taken on line 2—2 of Fig. 1.
Figure 3:
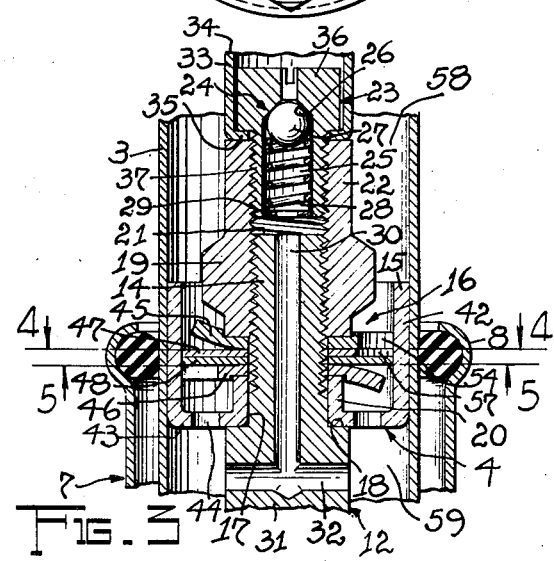
Fig. 3 is an enlarged fragmentary sectional view of the spring-controlling unit showing specifically the valved piston and the valved, tubular piston guide rod thereof.
Figure 4:
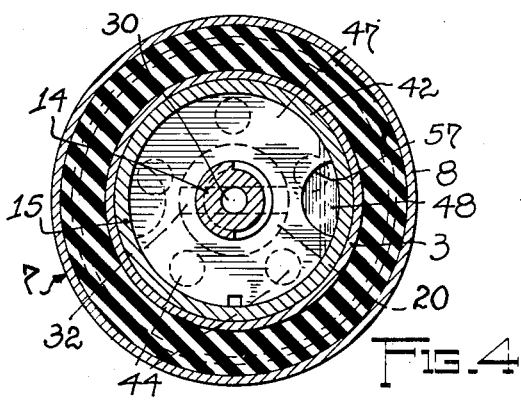
Fig. 4 is a cross sectional view taken on line 4—4 of Fig. 3.

Referring now in detail to the exemplified form of the invention shown in the drawings, reference numeral 2 denotes a double-acting, hydraulic, spring-controlling unit which embodies a tubular cylinder 3, forming the working chamber of the spring-controlling unit, and a valved piston arrangement 4 slidably mounted in cylinder 3. The tubular cylinder is fluid-tightly sealed at its opposite ends by perforated cap members 5 and 6 and encircled by a tubular shielding sleeve 7 which has its upper end 8 slidably engaged with the peripheral wall of tubular cylinder 3. This tubular shielding sleeve mounts at its lower end 9 a perforated cap 10 which is directly rigidly coupled with the reduced threaded lower end 11 of a piston rod 12 extended from piston member 15 of the valved piston arrangement 4 to and through cap member 6 of cylinder 3 and to and through tubular shielding sleeve 7 and its perforated cap 10. Piston rod 12 includes at its upper end a reduced threaded end portion 14 which is engaged with the valved piston arrangement 4, embodying the cup-shaped piston member 15 and a valve assembly 16. The end portion 14 of piston rod 12 is extended through an axial bore 17 in the cup-shaped piston member 16 circumferentially seated upon a circular shoulder 18 of piston rod 12. Cup-shaped piston member 15 mounts valve assembly 16, to be described later, and is sleeved on the reduced end 14 of piston rod 12 and rigidly secured to the piston rod by a coupling nut 19 threaded upon the threaded end portion 14 of the piston rod to tightly seat valve assembly 16 on a circular vertical flange 20 of cup-shaped piston member 15. Coupling nut 19 is dimensioned to extend substantially beyond end face 21 of end portion 14 and mounts in extended portion 22 a capscrew-like body 23 of a check valve 24 which has its body threadedly engaged with coupling unit 19. Check valve body 23 includes an axial bore 25 which is formed with a valve seat 26 and supports a ball valve 27 yieldingly shifted toward said valve seat by a compression spring 28 held in place by a perforated washer 29. End portion 14 of piston rod 12 includes an axial bore 30 which is extended somewhat into main body 31 of said piston rod to intersect a cross bore 32 in said main body and effect communication of bore 32 with cylinder 3 in an area below piston member 15.

Coupling nut 19, which attaches piston member 15 and valve assembly 16 to piston rod 12, furthermore cooperates with check valve body 23 in attaching a tubular liquid storage element 33 to piston rod 12. For such purpose, storage element 33 consists of a tubular cylinder 34, the diameter of which equals the diameter of piston rod 12. Tubular cylinder 34 has its lower end circumferentially flanged inwardly and provides a circumferential, axially perforated seat 35 for head portion 36 of check valve body 23 and permits extension of threaded neck portion 37 of said check valve body outside of the cylinder 34 for threaded coupling engagement with the portion 22 of coupling nut 19. The tubular cylinder 34 extends from tubular cylinder 3 into a tubular cylinder 38 through upper cap member 5 of cylinder 3, which cap member is formed with a tubular guiding and sealing extension 39 preventing during compression strokes of the controlling unit escape of pressure liquid from cylinder 3 into tubular cylinder 38 which is fluid-tightly attached to the tubular guiding and sealing extension 39 and closed by a cap 40.

The valved piston arrangement 4, which has its valve assembly 16 mounted in cup-shaped piston member 15, slidably engages with its peripheral wall 42 the inner wall of tubular cylinder 3. This piston member 15 is formed with a bottom wall 43 including axially offset bores 44 and an axial bore 17 which is encircled by the inner circular flange 20 seating valve assembly 16. This assembly embodies two axially aligned, spaced valve backing plates 45, 46 and two resiliently deformable valve disks 48, 48 arranged between said valve backing plates. These valve backing plates are of identical construction and embody each a substantially circular, disk-like member having an axial bore 49, which is recessed to provide for assembly proceedings proper contact of valve backing plates 45 and 46 with inner flange 20 and coupling nut 19. In addition, each valve backing plate is partly curved to form such plate with a backing surface 50 embodying a surface portion 51 which extends in a straight plane and a surface portion 52 which extends in a curved plane. The curved surface portion 52 of each backing plate is cut off at 53 to facilitate the flow of liquid through the valve assembly and the straight surface portion 51 of each backing plate is provided with a cut out area 54 diametrically opposite to cut-off 53 to establish the initial liquid pressure necessary to effect actuation of the valve assembly, as will be described later.

Resiliently deformable valve disks 47 and 48 include axial bores 55, 56, respectively, and differ in construction from each other, as upper valve disk 47 is additionally provided with a cut out area 57 to apply the pressure liquid directly upon a restricted area of lower valve disk 48 covered by upper valve disk 47.

The valve backing plates 45 and 46 contact with their backing surfaces 50 the valve disks 47, 48 so that the curved surface portions 52 of plates 45 and 46 extend in opposite directions and permit differential limited bending of valve disks 47, 48 when subjected to differentiating liquid pressures in chamber portions 58, 59 of cylinder 3. Initial bending of valve disk 48 in a downward direction by liquid pressure during a compression stroke of the controlling unit (see Fig. 6) is effected when the liquid pressure in upper chamber portion 58 acts upon the exposed area of valve disk 48 covered by valve disk 47 and counteracts the inherent yielding resistance of valve disk 48, thereafter, the liquid pressure actuates upon the full area of valve disk 48, whereas bending of valve disk 48 in an upward direction during the rebound stroke of the controlling unit by liquid pressure in the lower chamber portion 59 is counteracted by the inherent yielding resistance of valve disk 48 and valve disk 47, so that the valve assembly offers less resistance to the compression stroke in which liquid under pressure travels from upper chamber portion 58 to lower chamber portion 59, then to the rebound stroke in which liquid under pressure travels in an opposite direction from lower chamber portion 59 to upper chamber portion 58.

When attached to the frame and axle of an automobile, relative movements between frame and axle effect reciprocating movements of valved piston arrangement 4 in cylinder 3 and force liquid under pressure from chamber portion 58 through the valve assembly of said valved piston arrangement into chamber portion 59 and vice versa. In this operation, the volume of liquid transferred from and into respective chamber portions 58 and 59 is identical, due to the extension of piston rod 12 from the lower end of valved piston arrangement 4 to and through chamber portion 59 and the extension of tubular cylinder 34 from the upper end of said valved piston arrangement to and through chamber portion 58.

In the operation of the spring-controlling unit, any liquid leakage of cylinder 3 into shielding sleeve 7 escapes through holes 60 in the perforated cap 10 and any such liquid leakage is automatically replenished by liquid from storage element 33 which is filled with liquid. Element 33 is in valved communication with lower chamber portion 59 of cylinder 3 through check valve 24, axial bore 30 and cross bore 32 and feeds replenishing liquid during the compression strokes into the lower chamber, as during a compression stroke valved piston arrangement 4 travels in an upward direction and effects in lower chamber portion 59 a negative pressure and in tubular cylinder 38 a positive pressure by entering of element 33 through guiding and sealing extension 39 in plunger-type pump action into tubular cylinder 38. The negative pressure in lower chamber portion 59 and the positive pressure in tubular cylinder 38 jointly effect opening up of check valve 24 and discharge of replenishing liquid from element 33 into lower chamber portion 59 until the liquid lost by leakage is fully replenished.

Having thus described my invention, what I claim is:

1. In a double acting, hydraulic spring controlling unit with cylinder means and valved piston means controlling the flow of liquid in said cylinder means, a piston rod, a tubular liquid storage element, and a valve-controlled, elongated nut member securing the piston rod and tubular liquid storage element to each other and to the valved piston means, said piston rod having an axially perforated, threaded end portion extended through the valved piston means and threadedly engaged with one end of the elongated nut member, said elongated nut member including at its other end check valve means embodying a screw-like body coupled with the tubular liquid storage element and threadedly engaged with the elongated nut member.

2. A double-acting, hydraulic spring-controlling unit of the type described in claim 1, wherein said check valve means includes a check valve arranged to effect unidirectional flow of liquid from said liquid storage element into said cylinder.

References Cited in the file of this patent

UNITED STATES PATENTS

| 2,106,886 | Chisholm | Feb. 1, 1938 |
| 2,630,193 | Funkhouser | Mar. 3, 1953 |
| 2,657,770 | Rossman | Nov. 3, 1953 |
| 2,698,675 | Rossman | Jan. 4, 1955 |

FOREIGN PATENTS

| 654,039 | France | May 10, 1928 |
| 1,008,843 | France | Feb. 27, 1952 |
| 681,961 | Great Britain | Oct. 29, 1952 |